US008535147B2

(12) United States Patent
Ward

(10) Patent No.: US 8,535,147 B2
(45) Date of Patent: Sep. 17, 2013

(54) GAMING SYSTEM HAVING PROGRESSIVE JACKPOTS FLEXIBLY LINKED WITH COMMON PROGRESSIVE POOL

(75) Inventor: Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/495,955

(22) Filed: Jun. 13, 2012

(65) Prior Publication Data

US 2012/0315982 A1 Dec. 13, 2012

Related U.S. Application Data

(63) Continuation of application No. 12/597,316, filed as application No. PCT/US2008/005025 on Apr. 18, 2008, now Pat. No. 8,251,804.

(60) Provisional application No. 60/925,835, filed on Apr. 23, 2007.

(51) Int. Cl.
*A63F 13/00* (2006.01)

(52) U.S. Cl.
USPC .................................. 463/27; 463/25; 463/26

(58) Field of Classification Search
USPC ..................................................... 463/25–27
See application file for complete search history.

(56) References Cited

U.S. PATENT DOCUMENTS 7,384,337 B2 6/2008 Thomas .......................... 463/27
7,419,430 B1 9/2008 Joshi et al. ...................... 463/27
7,510,473 B2 3/2009 Thomas .......................... 463/25
2004/0242320 A1 12/2004 Jackson .......................... 463/26
2005/0003880 A1 1/2005 Englman et al. ................ 463/16
2005/0059472 A1 3/2005 Joshi .............................. 463/20
2005/0059481 A1 3/2005 Joshi et al. ...................... 463/24
2005/0239542 A1 10/2005 Olsen ............................. 463/27
2006/0142079 A1 * 6/2006 Ikehara et al. ................. 463/27
2006/0178203 A1 8/2006 Hughes et al. ................. 463/20

(Continued)

FOREIGN PATENT DOCUMENTS

WO WO 2005/029220 A 3/2005
WO WO 2005/032675 A2 4/2005

(Continued)

OTHER PUBLICATIONS

PCT International Search Report for International Application No. PCT/US2008/005025 dated Sep. 9, 2008 (4 pages).

(Continued)

*Primary Examiner* — Arthur O. Hall
*Assistant Examiner* — Jeffrey Wong
(74) *Attorney, Agent, or Firm* — Nixon Peabody LLP

(57) ABSTRACT

A gaming system includes at least one memory device storing instructions that, when executed by at least one processor, cause the gaming system to receive wagers in response to inputs via at least one input device, and increment one or more first progressive jackpots by respective individual increment amounts totaling a total increment amount. One or more second progressive jackpots are incremented by respective individual increment amounts totaling the total increment amount, the total increment amount being based on the received wagers. In response to a triggering event awarding at least one of the first progressive jackpots, the awarded first progressive jackpot is reset to its reset value and the individual increment amount for the awarded first progressive jackpot is deducted from at least one of the second progressive jackpots.

19 Claims, 9 Drawing Sheets

(56) References Cited

U.S. PATENT DOCUMENTS

| | | | | |
|---|---|---|---|---|
| 2006/0287077 | A1 | 12/2006 | Grav et al. | 463/27 |
| 2007/0026941 | A1 | 2/2007 | Lee et al. | 463/29 |
| 2007/0060263 | A1 | 3/2007 | Englman et al. | 463/16 |
| 2007/0060319 | A1 | 3/2007 | Lee et al. | 463/29 |
| 2007/0060321 | A1 | 3/2007 | Vasquez et al. | 463/27 |
| 2007/0213114 | A1 | 9/2007 | Casper et al. | 463/16 |
| 2007/0259711 | A1 | 11/2007 | Thomas | 463/22 |
| 2008/0015012 | A1 | 1/2008 | Englman et al. | 436/25 |
| 2008/0108428 | A1 | 5/2008 | Thomas | 463/25 |
| 2008/0248862 | A1 | 10/2008 | Joshi et al. | 463/20 |
| 2009/0042638 | A1 | 2/2009 | Thomas | 463/20 |
| 2009/0042643 | A1 | 2/2009 | Gagner et al. | 463/27 |
| 2009/0104986 | A1 | 4/2009 | Englman et al. | 463/27 |
| 2009/0117974 | A1 | 5/2009 | Hornik | 463/20 |
| 2009/0131159 | A1 | 5/2009 | Englman et al. | 463/27 |
| 2009/0149241 | A1 | 6/2009 | Thomas | 463/20 |
| 2009/0247277 | A1 | 10/2009 | Caspers et al. | 463/20 |
| 2009/0247292 | A1 | 10/2009 | Caspers et al. | 463/27 |
| 2009/0270168 | A1 | 10/2009 | Englman et al. | 463/27 |

FOREIGN PATENT DOCUMENTS

| | | | |
|---|---|---|---|
| WO | WO 2005/099425 | A2 | 10/2005 |
| WO | WO 2005/113093 | A1 | 12/2005 |
| WO | WO 2006/014770 | A2 | 2/2006 |
| WO | WO 2006/014990 | A2 | 2/2006 |
| WO | WO 2006/039349 | A2 | 4/2006 |
| WO | WO 2006/130597 | A2 | 12/2006 |
| WO | WO 2006/130611 | A2 | 12/2006 |
| WO | WO 2007/028108 | A2 | 3/2007 |
| WO | WO 2007/117502 | A2 | 10/2007 |
| WO | WO 2007/123858 | A2 | 11/2007 |
| WO | WO 2008/005366 | A2 | 1/2008 |
| WO | WO 2008/010904 | A2 | 1/2008 |
| WO | WO 2008/021449 | A2 | 2/2008 |
| WO | WO 2008/039403 | A2 | 4/2008 |
| WO | WO 2008/057356 | A2 | 5/2008 |
| WO | WO 2008/063297 | A2 | 5/2008 |
| WO | WO 2008/063394 | A2 | 5/2008 |
| WO | WO 2008/133849 | A1 | 11/2008 |
| WO | WO 2009/032150 | A1 | 3/2009 |
| WO | WO 2009/061358 | A1 | 5/2009 |
| WO | WO 2009/091675 | A1 | 7/2009 |
| WO | WO 2009/091676 | A1 | 7/2009 |

OTHER PUBLICATIONS

PCT International Written Opinion for International Application No. PCT/US2008/005025 dated Sep. 9, 2008 (6 pages).

* cited by examiner

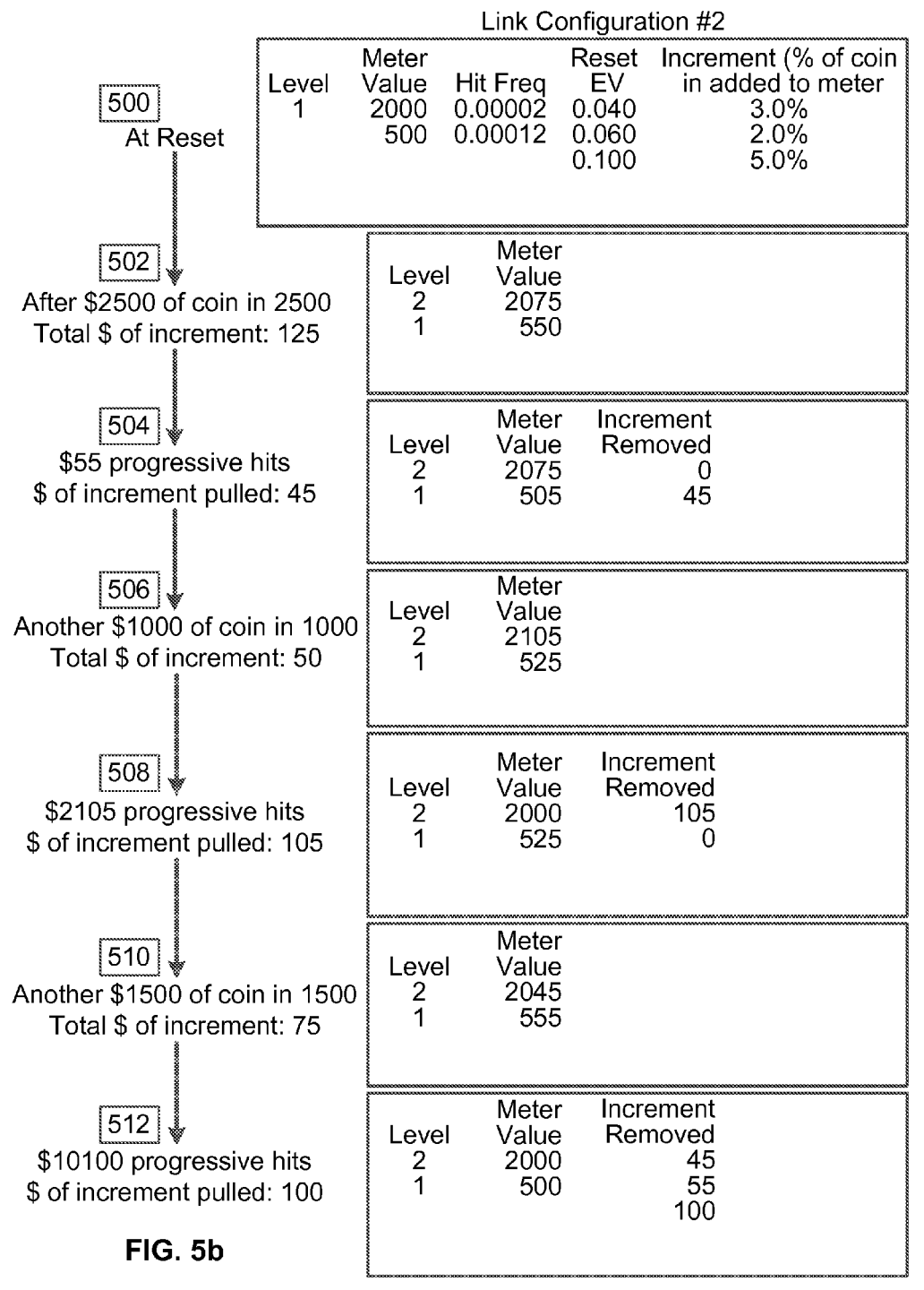

Link Configuration #2

500
At Reset

| Level | Meter Value | Hit Freq | Reset EV | Increment (% of coin in added to meter |
|---|---|---|---|---|
| 1 | 2000 | 0.00002 | 0.040 | 3.0% |
| | 500 | 0.00012 | 0.060 | 2.0% |
| | | | 0.100 | 5.0% |

502
After $2500 of coin in 2500
Total $ of increment: 125

| Level | Meter Value |
|---|---|
| 2 | 2075 |
| 1 | 550 |

504
$55 progressive hits
$ of increment pulled: 45

| Level | Meter Value | Increment Removed |
|---|---|---|
| 2 | 2075 | 0 |
| 1 | 505 | 45 |

506
Another $1000 of coin in 1000
Total $ of increment: 50

| Level | Meter Value |
|---|---|
| 2 | 2105 |
| 1 | 525 |

508
$2105 progressive hits
$ of increment pulled: 105

| Level | Meter Value | Increment Removed |
|---|---|---|
| 2 | 2000 | 105 |
| 1 | 525 | 0 |

510
Another $1500 of coin in 1500
Total $ of increment: 75

| Level | Meter Value |
|---|---|
| 2 | 2045 |
| 1 | 555 |

512
$10100 progressive hits
$ of increment pulled: 100

| Level | Meter Value | Increment Removed |
|---|---|---|
| 2 | 2000 | 45 |
| 1 | 500 | 55 |
| | | 100 |

FIG. 5b

Link Configuration #3

500
At Reset

| Level | Meter Value | Hit Freq | Reset EV | Increment (% of coin in added to meter |
|---|---|---|---|---|
| 4 | 5000 | 0.00001 | 0.050 | 1.0% |
| 3 | 1000 | 0.00001 | 0.010 | 1.0% |
| 2 | 150 | 0.00020 | 0.030 | 1.2% |
| 1 | 10 | 0.00100 | 0.010 | 1.8% |
| | | | 0.100 | 5.0% |

502
After $2500 of coin in 2500
Total $ of increment: 125

| Level | Meter Value |
|---|---|
| 4 | 5025 |
| 3 | 1025 |
| 2 | 180 |
| 1 | 55 |

504
$55 progressive hits
$ of increment pulled: 45

| Level | Meter Value | Increment Removed |
|---|---|---|
| 4 | 5025 | 0 |
| 3 | 1025 | 0 |
| 2 | 180 | 0 |
| 1 | 10 | 45 |

506
Another $1000 of coin in 1000
Total $ of increment: 50

| Level | Meter Value |
|---|---|
| 4 | 5035 |
| 3 | 1035 |
| 2 | 192 |
| 1 | 28 |

508
$2105 progressive hits
$ of increment pulled: 105

| Level | Meter Value | Increment Removed |
|---|---|---|
| 4 | 5025 | 10 |
| 3 | 1000 | 35 |
| 2 | 150 | 42 |
| 1 | 10 | 18 |
| | | 105 |

510
Another $1500 of coin in 1500
Total $ of increment: 75

| Level | Meter Value |
|---|---|
| 4 | 5040 |
| 3 | 1015 |
| 2 | 168 |
| 1 | 37 |

512
$10100 progressive hits
$ of increment pulled: 100

| Level | Meter Value | Increment Removed |
|---|---|---|
| 4 | 5000 | 40 |
| 3 | 1000 | 15 |
| 2 | 150 | 18 |
| 1 | 10 | 27 |
| | | 100 |

FIG. 5c

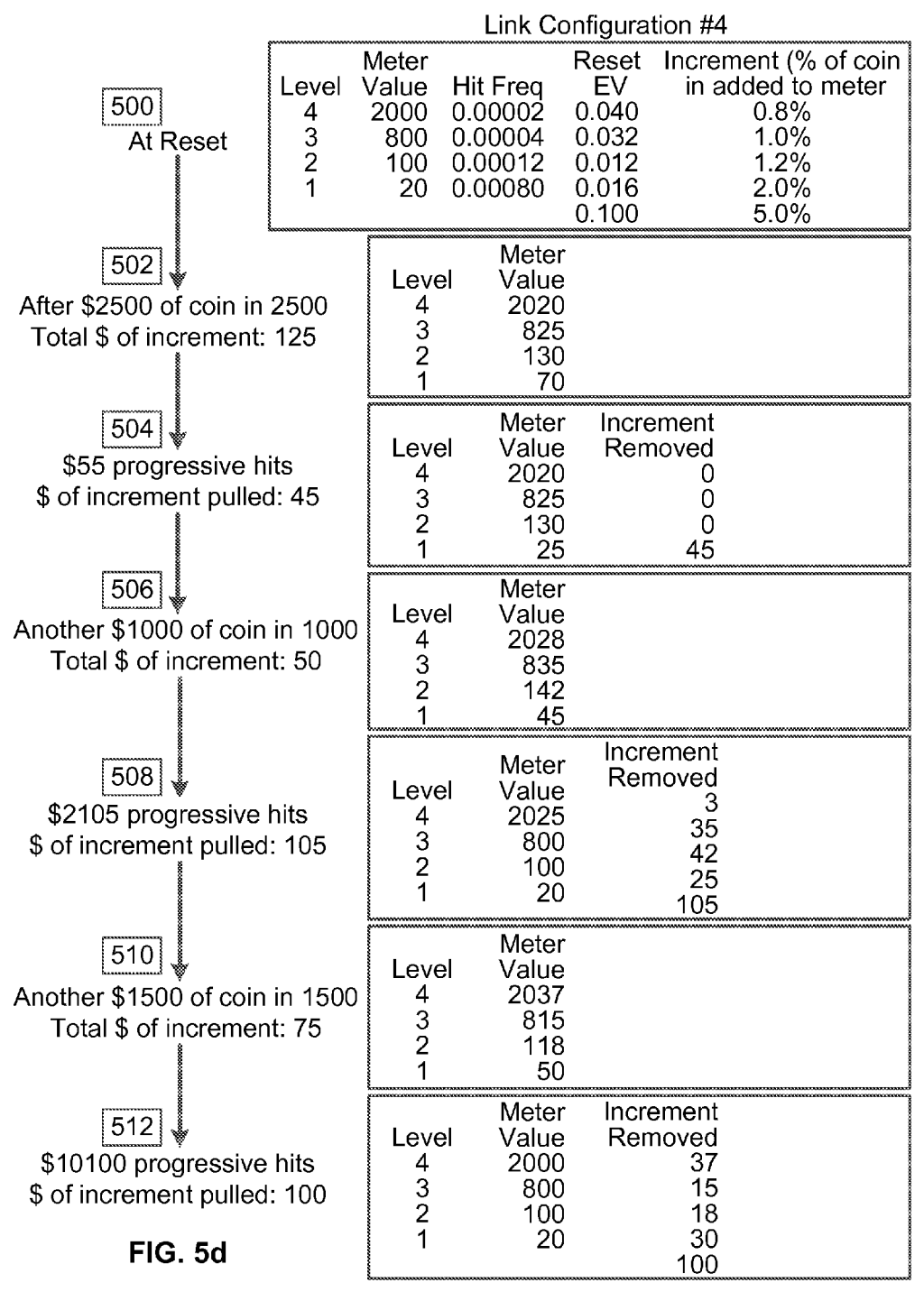

Link Configuration #4

| Level | Meter Value | Hit Freq | Reset EV | Increment (% of coin in added to meter |
|---|---|---|---|---|
| 4 | 2000 | 0.00002 | 0.040 | 0.8% |
| 3 | 800 | 0.00004 | 0.032 | 1.0% |
| 2 | 100 | 0.00012 | 0.012 | 1.2% |
| 1 | 20 | 0.00080 | 0.016 | 2.0% |
| | | | 0.100 | 5.0% |

500
At Reset

502
After $2500 of coin in 2500
Total $ of increment: 125

| Level | Meter Value |
|---|---|
| 4 | 2020 |
| 3 | 825 |
| 2 | 130 |
| 1 | 70 |

504
$55 progressive hits
$ of increment pulled: 45

| Level | Meter Value | Increment Removed |
|---|---|---|
| 4 | 2020 | 0 |
| 3 | 825 | 0 |
| 2 | 130 | 0 |
| 1 | 25 | 45 |

506
Another $1000 of coin in 1000
Total $ of increment: 50

| Level | Meter Value |
|---|---|
| 4 | 2028 |
| 3 | 835 |
| 2 | 142 |
| 1 | 45 |

508
$2105 progressive hits
$ of increment pulled: 105

| Level | Meter Value | Increment Removed |
|---|---|---|
| 4 | 2025 | 3 |
| 3 | 800 | 35 |
| 2 | 100 | 42 |
| 1 | 20 | 25 |
| | | 105 |

510
Another $1500 of coin in 1500
Total $ of increment: 75

| Level | Meter Value |
|---|---|
| 4 | 2037 |
| 3 | 815 |
| 2 | 118 |
| 1 | 50 |

512
$10100 progressive hits
$ of increment pulled: 100

| Level | Meter Value | Increment Removed |
|---|---|---|
| 4 | 2000 | 37 |
| 3 | 800 | 15 |
| 2 | 100 | 18 |
| 1 | 20 | 30 |
| | | 100 |

FIG. 5d

GAMING SYSTEM HAVING PROGRESSIVE JACKPOTS FLEXIBLY LINKED WITH COMMON PROGRESSIVE POOL

CROSS REFERENCE To RELATED APPLICATIONS

This application is a continuation of U.S. patent application Ser. No. 12/597,316, titled "Gaming System Having Progressive Jackpots Flexibly Linked With Common Progressive Pool" and filed Oct. 23, 2009, now U.S. Pat. No. 8,251,804 now allowed, which is a U.S. national stage of International Application No. PCT/US2008/005025, titled "Gaming System Having Progressive Jackpots Flexibly Linked With Common Progressive Pool" and filed Apr. 18, 2008, which claims priority to U.S. Provisional Patent Application Ser. No. 60/925,835, titled "Gaming System Having Progressive Jackpots Flexibly Linked With Common Progressive Pool" and filed on Apr. 23, 2007, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having progressive jackpots flexibly linked with at least one common progressive pool.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, gaming machines employing progressive jackpots utilize discreet progressive jackpot systems for one or more groups of gaming machines. For example, a first group of gaming machines may be configured to contribute to a first progressive jackpot, while a second group of gaming machines may be configured to contribute to a second progressive jackpot. The two systems traditionally operate independently such that if the first progressive jackpot is triggered, one of the gaming machines in the first group receives the jackpot award and the first progressive jackpot is reset. The gaming machines in the second group, and the second progressive jackpot are unaffected. One problem that arises with such a configuration is that the independently operated progressive jackpot systems are not coordinated and therefore require longer periods of time to amass large jackpots to be awarded. This dilemma in turn causes lower frequency of jackpot triggering events, thereby diminishing from the excitement and enjoyment of the gaming system. Another problem arises is that even traditional progressive systems which offer multi-level progressive awards fail to adequately entertain and cause excitement amongst players, often only awarding the lowest level progressive award. The present invention is directed to solving these and other problems.

SUMMARY OF THE INVENTION

According to one aspect of the present invention, a gaming system includes at least one memory device storing instructions that, when executed by at least one processor, cause the gaming system to receive wagers in response to inputs via at least one input device, and increment one or more first progressive jackpots by respective individual increment amounts totaling a total increment amount. One or more second progressive jackpots are incremented by respective individual increment amounts totaling the total increment amount, the total increment amount being based on the received wagers. In response to a triggering event awarding at least one of the first progressive jackpots, the awarded first progressive jackpot is reset to its reset value and the individual increment amount for the awarded first progressive jackpot is deducted from at least one of the second progressive jackpots.

According to another aspect of the invention, a computer-implemented method in a gaming system includes receiving wagers in response to inputs via at least one input device, and displaying on at least one display device one or more first progressive jackpots and one or more second progressive jackpots. The method further includes incrementing, by one or more processors, one or more of the first progressive jackpots by respective individual increment amounts totaling a total increment amount. One or more of the second progressive jackpots are incremented, by at least one of the one or more processors, by respective individual increment amounts totaling the total increment amount, the total increment amount being based on the received wagers. In response to a triggering event awarding at least one of the first progressive jackpots, the awarded first progressive jackpot is reset, by at least one of the one or more processors, to its reset value and the individual increment amount for the awarded first progressive jackpot is deducted from at least one of the second progressive jackpots.

According to yet another aspect of the invention, one or more machine-readable non-transitory storage media include instructions which, when executed by one or more processors, cause the one or more processors to perform a plurality of operations. The operations include receiving wagers in response to inputs via at least one input device, and incrementing one or more first progressive jackpots by respective individual increment amounts totaling a total increment amount. One or more second progressive jackpots are incremented by respective individual increment amounts totaling the total increment amount, the total increment amount being based on the received wagers. In response to a triggering event awarding at least one of the first progressive jackpots, the awarded first progressive jackpot is reset to its reset value and the individual increment amount for the awarded first progressive jackpot is deducted from at least one of the second progressive jackpots.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5*b* is a flow chart illustrating a second link configuration of the example of operation of the progressive wagering system of FIG. 4.

FIG. 5*c* is a flow chart illustrating a third link configuration of the example of operation of the progressive wagering system of FIG. 4.

FIG. 5*d* is a flow chart illustrating a fourth link configuration of the example of operation of the progressive wagering system of FIG. 4.

DETAILED DESCRIPTION

Figure 1A:
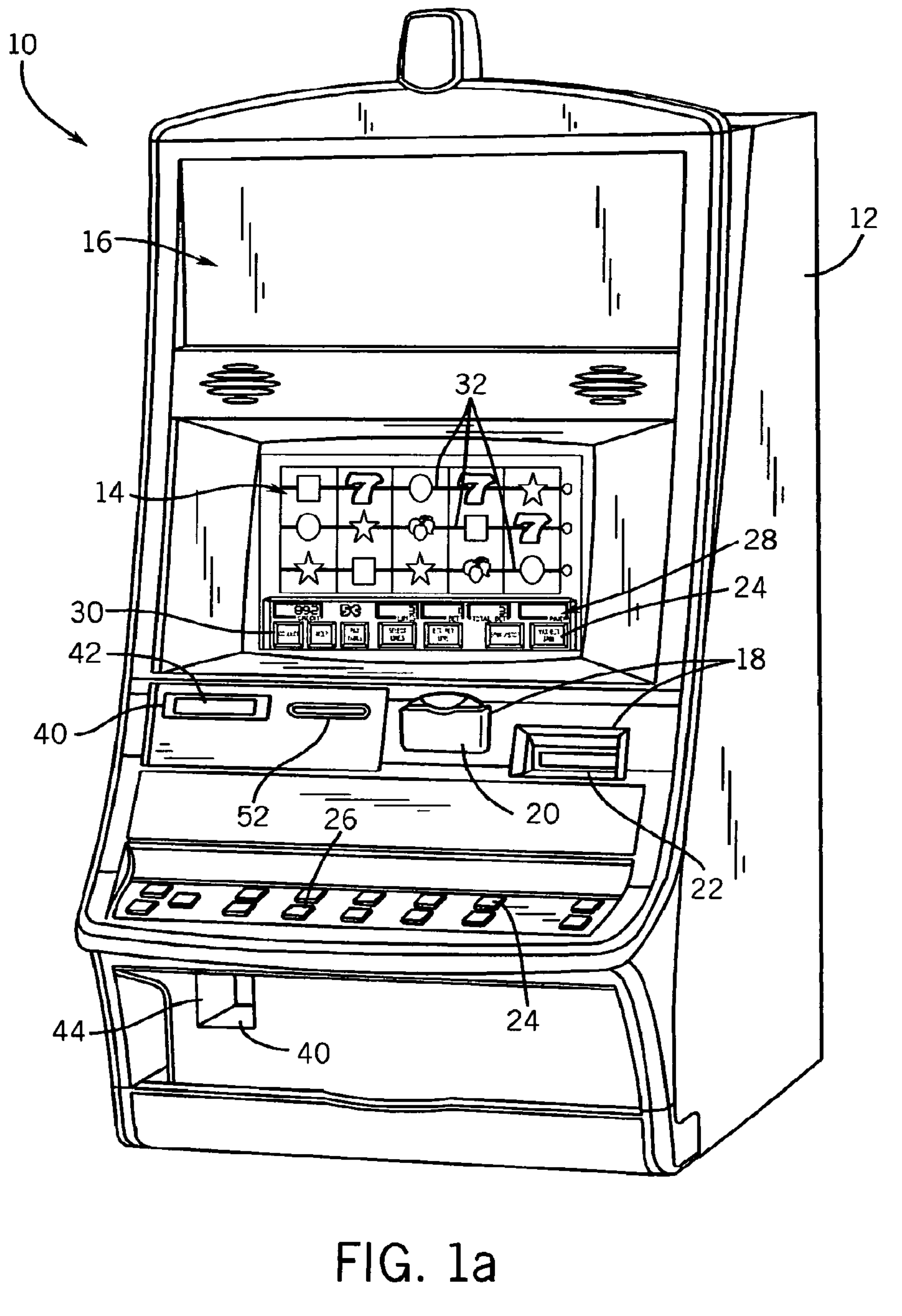
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, and RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Depicted in FIG. lb is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

Figure 1B:
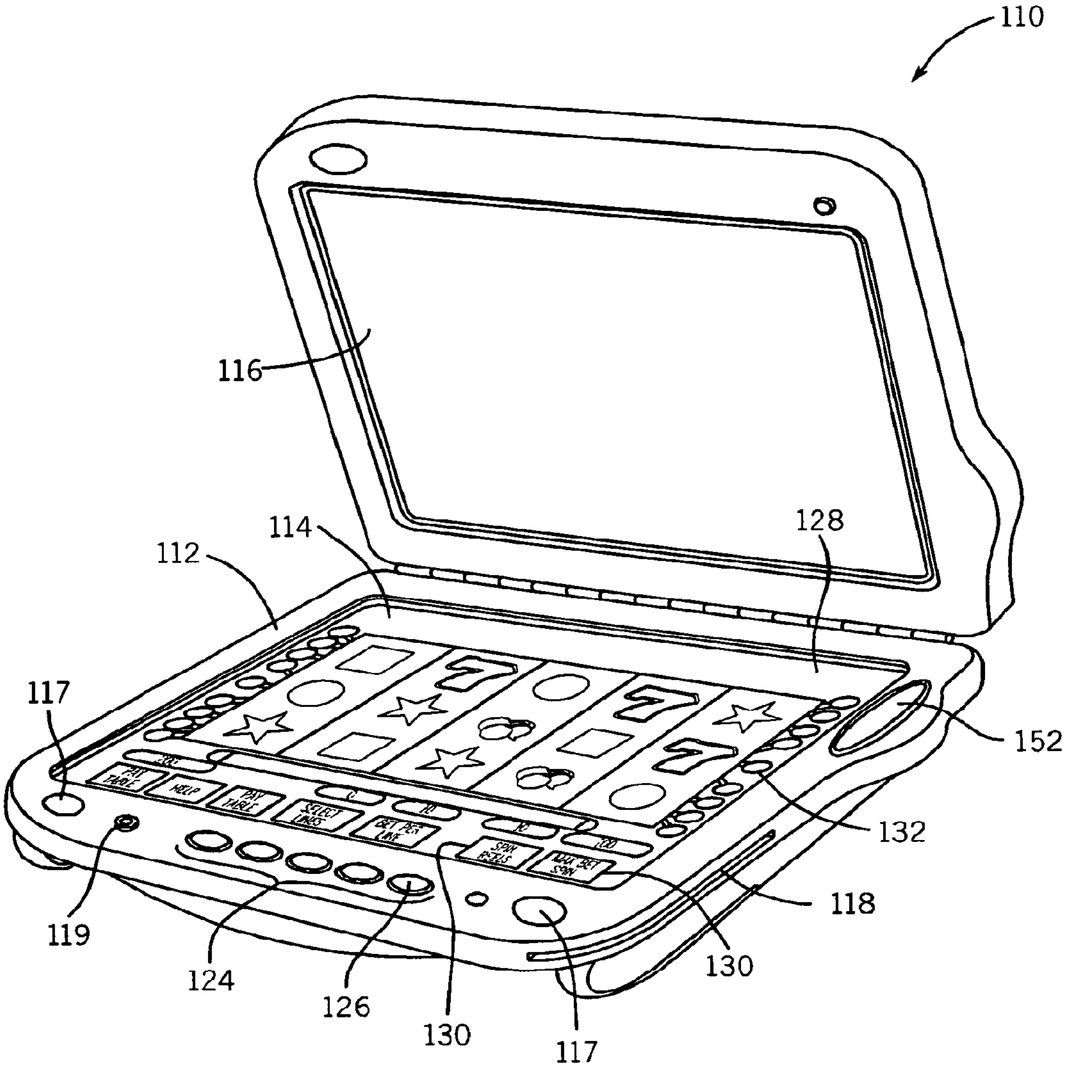
FIG. 1*b* is a perspective view of a handheld gaming machine embodying the present invention.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
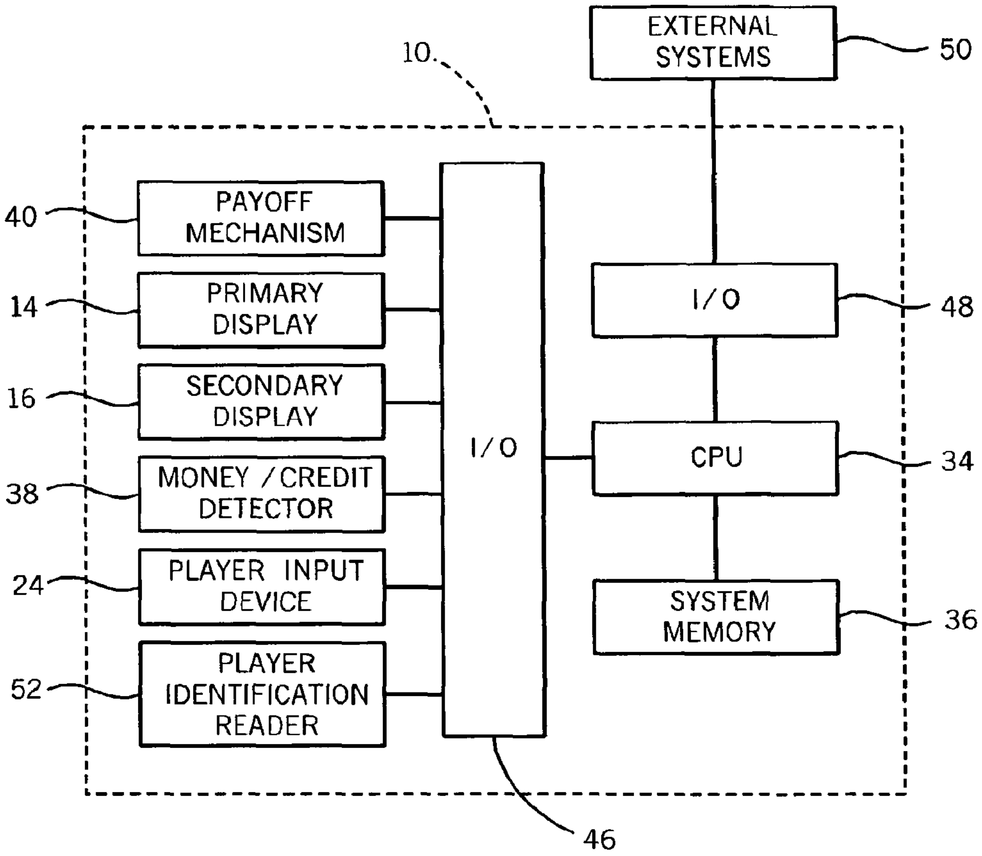
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
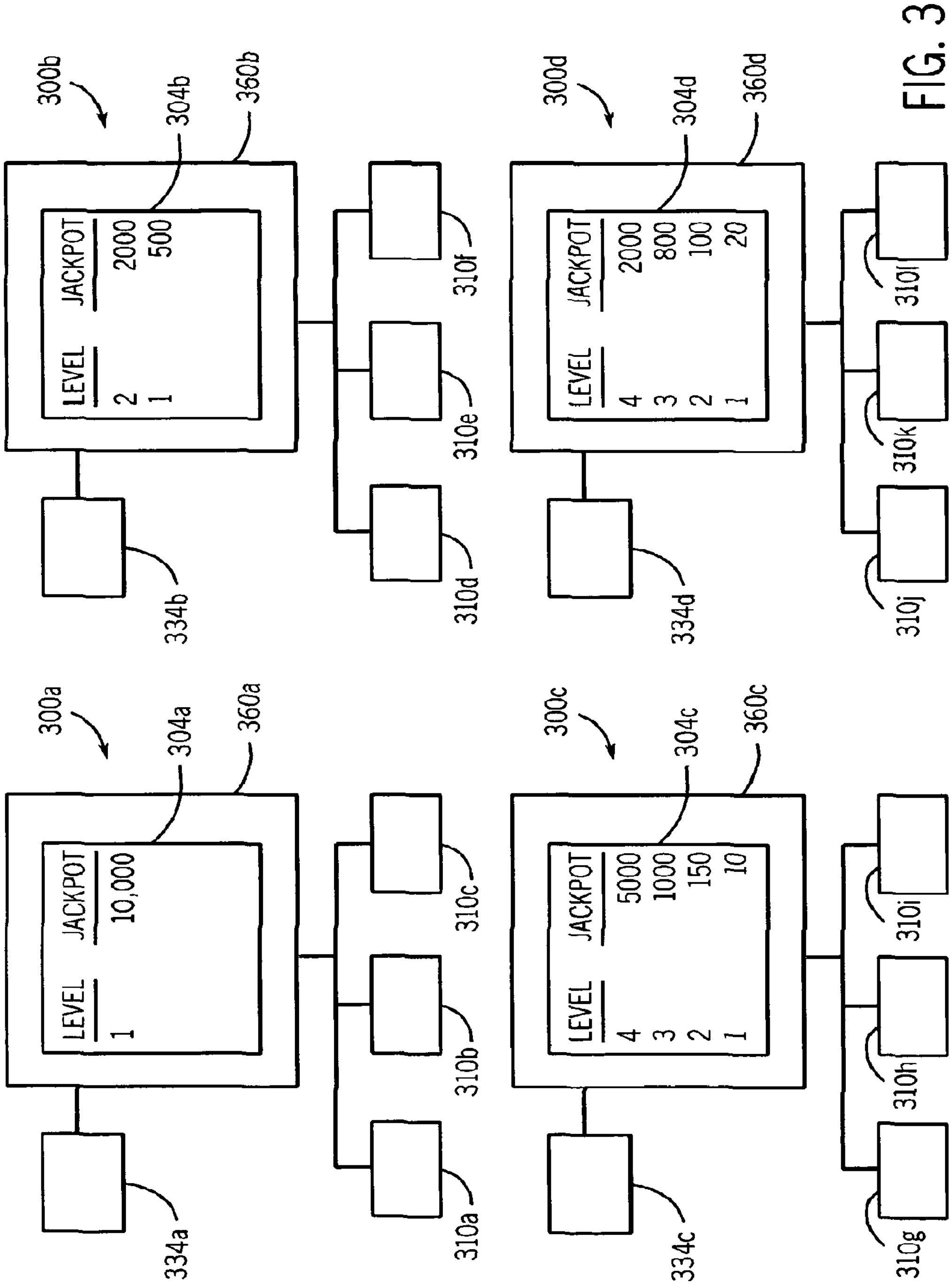
FIG. 3 is a block diagram of a plurality of traditional independent progressive systems.

Turning now to FIG. 3, a plurality of traditional progressive wagering systems 300*a,b,c,d* are diagrammed. Each of the progressive systems 300*a-d* plays a separate and distinct progressive wagering game 360*a,b,c,d*. Thus, the four systems 300*a-d* may have wagering games 360*a-d* that may differ in theme, appearance, gameplay, betting structure, and may include any variety of mechanical, electromechanical or video displayed elements. Each progressive wagering system 300*a-d* is connected with a plurality of gaming machines or gaming devices 310. The first system 300*a* includes three gaming machines 310*a,b,c*. The second system 300*b* includes three gaming machines 310*d,e,f*. The third system 300*c* includes three gaming machines 310*g,h,i*. The fourth system 300*d* also includes three gaming machines 310*j,k,l*.

As seen in FIG. 3, each of the gaming machines are connected to only one of the four systems 300*a,b,c,d*. In this way, the gaming machines 310*a,b,c* of the first system 300*a* are separate, not connected with, and not in communication with the gaming machines 310*d-l* of the other three systems 300*b, c,d*. The gaming machines 310 of each system 300*a-d* are connected to separate controllers 334*a-d* of the system 300*a-d* via a network. Each controller 334*a-d* controls the execution of the progressive wagering game 360*a-d* played on that system 300*a-d*. Wagers which are input into the first system 300*a* for play on one of the gaming machines 310*a,b,c* of the system 300*a* are used to fund the first progressive wagering game 360*a* of that system 300*a*. However, since the systems 300*a-d* do not communicate with one another, none of the wager inputs in one system 300 are used to fund the games 360 of another system 300. In this way, there is no commingling of wagers or coin in between systems 300*a-d*.

Figure 4:
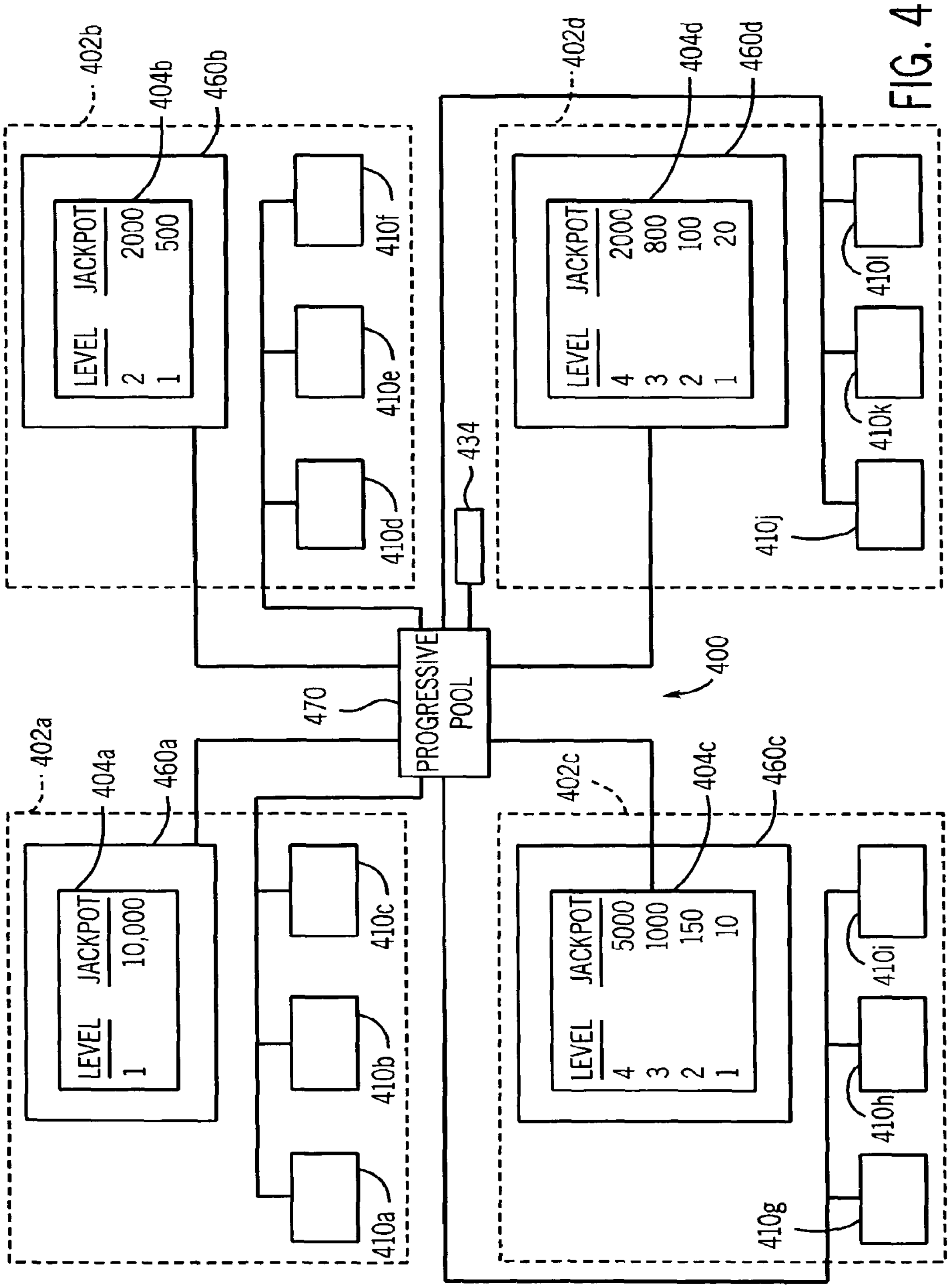
FIG. 4 is a block diagram of an embodiment of a progressive wagering system flexibly linked to a common progressive pool.
Figure 5A:
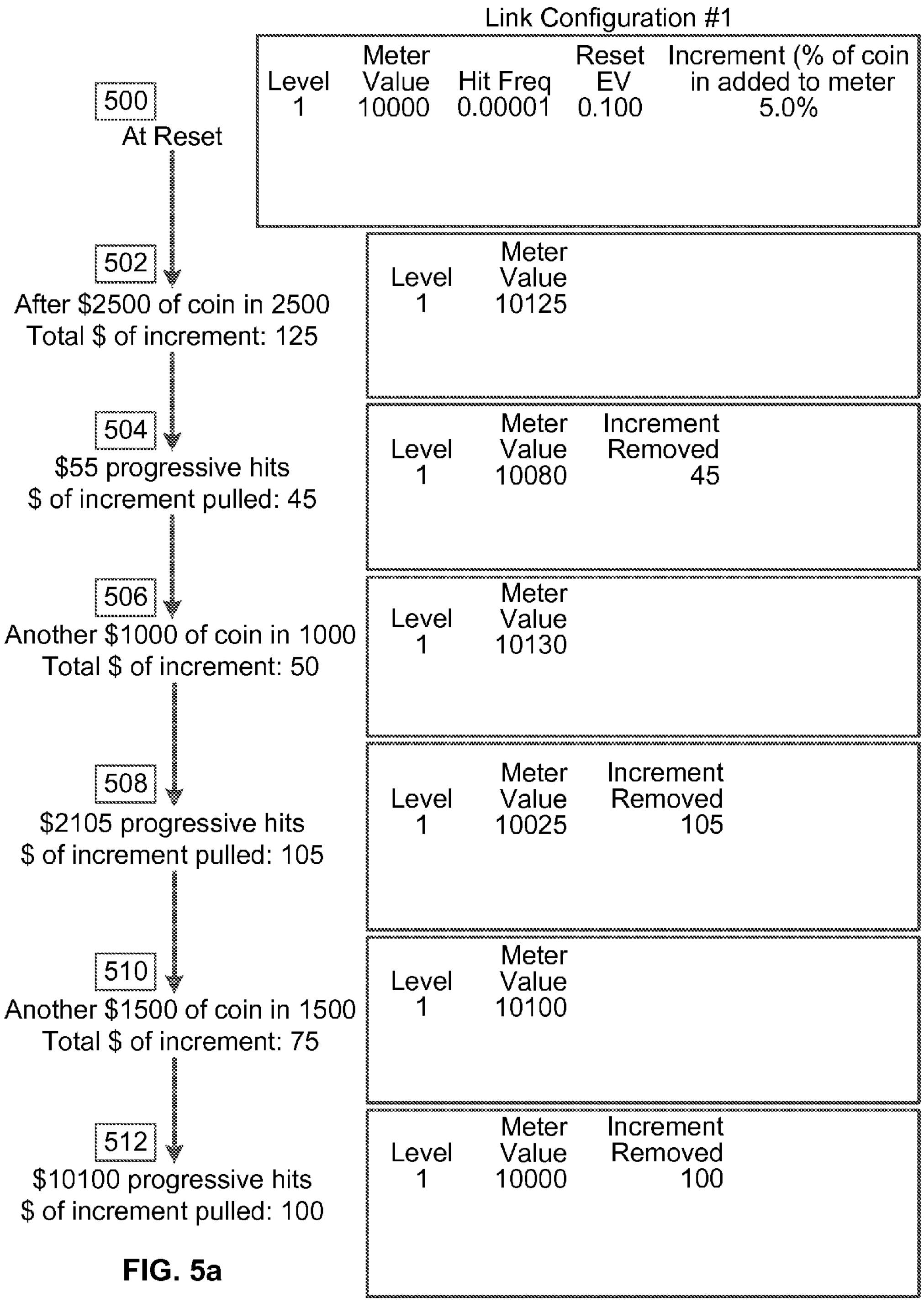
FIG. 5*a* is a flow chart illustrating a first link configuration of an example of operation of the progressive wagering system of FIG. 4.

In FIG. 4, a linked progressive system 400 is shown. The linked system 400 comprises a plurality of linked progressive gaming subsystems 402*a-d*, a common progressive pool 470, and at least one controller 434. Each of the progressive gaming subsystems 402*a-d* comprises a plurality of gaming devices 410. For example, a first progressive gaming subsystem 402*a* includes three gaming devices 410*a,b,c* which may be any combination of freestanding gaming machines (such as the one in FIG. 1*a*), handheld gaming devices (such as the one in FIG. lb) or other wagering game devices. As described herein with reference to FIGS. 1*a*, 1*b* and 2, each gaming device 410 has an associated wager input device for funding play. Each progressive wagering subsystem 402*a-d* executes at least one progressive wagering game 460*a-d*, which may be any variety of wagering game having at least one progressively increasing jackpot. The progressive wagering games 460*a-d* may include selection games, slot reel games, board games, competitions, group games, interactive games, or any other wagering game in which one or more of the awards or prizes are progressive jackpots. In addition, each of the gaming devices 410 may execute one or more basic wagering games that may be independent of the progressive wagering game 460*a-d* of the subsystem 402*a-d* to which the gaming device 410 is connected.

Each of the progressive wagering subsystems 402*a-d* further includes at least one meter 404*a-d* for displaying progressive jackpot information for the subsystem 402*a-d* to players. The various meters 404*a-d* display jackpot levels and current jackpot values, and may display other information as well. The meters 404*a-d* may be dynamically updated to show incremental increases or decreases in jackpot values. The meters 404*a-d* may be freestanding meters, or may be incorporated into other displays, such as the display of one or more of the gaming devices 410 of a particular subsystem 402*a-d*, a community display which is used to display other information, such as the execution and gameplay of the associated progressive wagering game 460*a-d*, or integrated with any other display.

The gaming subsystems 402*a-d* are in communication with the progressive pool 470 and the controller 434 via one or more networks which may comprise wired or wireless connections, or both. The progressive wagering subsystems 402*a-d* and the progressive pool 470 are under control of the controller 434. The controller 434 may comprises a single controller in communication with the progressive pool 470, or may comprise a plurality of controllers in communication with various parts of the system 400, including the gaming devices 410, the meters 404, and the pool 470. The controller 434 operates the transfer of money between the gaming machines 410 and the progressive wagering subsystems 402*a-d*. As shown in FIG. 4, for all coin-in received by the system 400, the controller 434 removes the corresponding increment (in this embodiment, 5% as seen in FIGS. 5*a*-5*d*), and deposits the increment generated into the progressive pool 470 for further disbursement. The controller 434 further updates the meters 402*a-d* of the various progressive wagering subsystems 402*a-d* to reflect the addition of the increment generated. The controller 434 monitors the play of the progressive wagering games 460*a-d*, and when a jackpot triggering event occurs, the controller 434 operates to (i) award the triggered jackpot from the winning progressive subsystem 402*a-d* to the proper gaming device 410 in the system 400, (ii) pull the appropriate increment amount from the remaining non-winning progressive subsystems 402*a-d,* (iii) update the meters of the winning progressive subsystem 402*a-d* by resetting the triggered jackpot to its reset value, and (iv) updating the meters 404*a-d* of the non-winning subsystems 402*a-d* by deducting or decrementing the pulled increment amount. This operation of the system 400 under control of the controller 434 is detailed further herein with relation to FIGS. 5*a*-5*d.*

As seen in FIG. 4, the various progressive wagering subsystems 402*a-d* have differing numbers of progressive jackpots available to be won. A first subsystem 402*a* has only a single progressive jackpot (level 1), which has a reset value of $10,000. A second subsystem 402*b* has two levels of progressive jackpots, having reset values of $500 and $2,000. A third subsystem 402*c* has four levels of progressive jackpots having reset values of $10, $150, $1,000 and $5,000 respectively. A fourth subsystem 402*d* also has four levels of progressive jackpots having reset values of $20, $100, $800 and $2,000 respectively. Each of the gaming devices 410 within, or associated with, a particular progressive wagering subsystem 402*a-d* participates in the associated progressive wagering game 460*a-d*, and is eligible to win the associated progressive jackpots displayed on the meter 404*a-d.*

Thus, for example, a player at a gaming device 410*j* associated with the fourth progressive wagering subsystem 402*d* plays the fourth progressive wagering game 460*d* and is eligible to win any of the four jackpots displayed on the fourth meter 404*d*. However, in an embodiment, that player is not eligible to win any of the jackpots displayed on the other three meters 404*a-c*. Moreover, in an embodiment, the player can only play the progressive wagering game 460*d* associated with the progressive wagering subsystem 402*d* with which his gaming device 410*j* is associated, and is unable to play the progressive wagering games 460*a-c* of the other three subsystems 402*a-c*. In this way, the various progressive wagering subsystems 402*a-d* may appear to a player to be independent of one another in that they execute differing wagering games 460*a-d*, and the jackpots of each subsystem 402*a-d* are available only to players of gaming machines 410 associated with such subsystem 402*a-d.* However, the progressive subsystems 402*a-d* are linked as described herein.

The various progressive subsystems 402*a-d* may be arranged in a variety of ways. For example, the first subsystem 402*a* may be a progressive wagering game 460*a* played on a community display which is mounted above a bank of gaming devices including the three devices 410*a,b,c* of the subsystem 402*a*. In another embodiment, the second subsystem 402*b,* for example, may be a progressive wagering game 460*b* where the meter 404*b* id displayed on the displays of the individual gaming devices 410*d,e,f,* which may be handheld devices networked together to form the subsystem 402*b*. In yet another embodiment, the third subsystem 402*c* may comprise a plurality of free standing gaming machines 410*g,h,i* each having a progressive jackpots displayed on a meter 404*c* comprising separate LED displays mounted on each device 410*g,h,i* even though the devices 410*g,h,i* are not physically located proximate one another. Thus, the physical embodiments of the described progressive subsystems 402*a-d* and the components thereof can take on many different forms.

Turning to FIGS. 5*a*-5*d*, an example of the operation of the linked progressive system 400 from FIG. 4 is shown. In FIGS. 5*a*-5*d*, the four Progressive Link Configurations (or four "links") correspond to the four progressive wagering subsystems 402*a-d* displaying the various progressive wagering games 460*a-d* from FIG. 4. Thus, the term "links" is used herein interchangeably or synonymously with "progressive wagering games" and is also meant to signify the four subsystems 402 from FIG. 4. At step 500, the linked progressive system 400 is shown at a reset or start up state. Each of the four link configurations includes meter values for the various levels of progressive jackpots on that link. At step 500, the meter values display reset values for the various jackpots. Thus, for Link 1, the level 1 reset value is $10,000.00. For Link 2, the level 1 reset value is $500 and the level 2 reset value is $2,000. For Link 3, the level 1 reset value is $10, the level 2 reset value is $150, the level 3 reset value is $1,000 and the level 4 reset value is $5,000. For Link 4, the level 1 reset value is $20, the level 2 reset value is $100, the level 3 reset value is $800 and the level 4 reset value is $2,000.

Moreover, each link includes configuration data comprising specific information relating to the hit frequency, reset expected value (reset E.V.) and increment for each of the links, and the jackpots on such link. Thus, as seen in FIGS. 5*a*-5*d*, for the level 1 jackpot, the only jackpot on link 1, the hit frequency is 0.00001, which means that particular jackpot will be awarded or triggered on average once every 100,000 plays of the wagering game. The reset EV for the same level 1 jackpot is 0.100. The reset EV is a function of the reset value and the hit frequency, and is given by the formula in Equation 1:

$$\text{Reset EV} = \text{Reset Value} \times \text{Hit Frequency} = \$10{,}000 \times 0.00001 = 0.100 \qquad \text{Equation 1}$$

The increment is the percentage of coin-in received that is added to the meter value. Thus, in this embodiment, the increment has been designated as five percent (5%), meaning that five percent of all wagers received into the system are added to the meter values of the system. The increment may be received from primary wagers, secondary wagers, or any other monetary inputs into the system.

For Links 2, 3, and 4, the various hit frequencies, reset EVs and increments are shown in FIGS. 5*b*-5*d.* Because these links are multi-level jackpot links, each level jackpot has its own hit frequency, reset EV and increment. However, the total reset EV for all of the jackpots on Link 2 is equal to 0.100. Similarly, the total reset EV for Links 3 and 4 is also 0.100. Moreover, each jackpot on Links 2, 3, and 4 has its own increment value. However, the total increment for Link 2 is five percent (5%). Similarly, the total increment for Links 3 and 4 is also five percent (5%). Thus, all four links, regardless of how many levels of jackpots are on the link, have the same total reset EV and the same total increment.

At step 502, the system 400 is shown after $2,500 of coin in has been received into the system. The coin in can be received at any wager input device or any of the gaming devices connected to the system 400. The meters are incremented by an amount equal to the coin in received times the increment percentage, which in this instance is $2,500 multiplied by five percent (5%) which is $125 of increment to be added to the meters of the system. As seen in step 502, $125 is added to the meters of each link. Since link 1 is a single level progressive jackpot, the entirety of the $125 is added to the level 1 jackpot such that the meter reads $10,125. For link 2, the $125 is added in part to the level 1 jackpot and in part to the level 2 jackpot. Specifically, fifty dollars ($50) is added to the level 1 jackpot and seventy-five dollars ($75) is added to the level 2 jackpot, such that the updated meter values reflect $550 and $2075, respectively. The increment amount of $125 is divided between the two jackpot levels in proportion to the jackpot increment percentage relative to the total increment percentage for that link. For example, of the five percent (5%) increment for link 2, three percent (3%) goes to the level 2 jackpot and two percent (2%) goes to the level 1 jackpot. Thus, in relative proportion, for every dollar of increment received by link 2, sixty percent (3%/5%) is added to the level 2 jackpot, and forty percent (2%/5%) is added to the level 1 jackpot. Thus, in this instance, when $125 of increment is received by link 2, $75 goes to the level 2 jackpot and $50 goes to the level 1 jackpot.

Similarly, link 3 is a multi-level jackpot progressive, which in this embodiment has four levels of jackpots. The increment percentages for levels 1 through 4 on link 3 are 1.8%, 1.2%, 1.0% and 1.0%, respectively. Like the other links, the increment amount of $125 is also added to link 3, and distributed among the four levels of jackpots in proportion to their relative increment percentages as compared to the overall increment percentage of 5%. Thus, of the $125 to be added to the link 3 meters, $45 [$125×(1.8%/5%)] is added to the level 1 jackpot, $30 [$125×(1.2%/5.0%)] is added to the level 2 jackpot, $25 [$125×(1.0%/5.0%)] is added to the level 3 jackpot and $25 [$125×(1.0%/5.0%)] is added to the level 4 jackpot. The meter reflects these added amounts in step 502 showing values of $55, $180, $1,025, and $5,025, respectively, for the four jackpot levels on link 3. In similar fashion, the four jackpot levels of link 4 are updated to reflect the addition of the $125 increment. Of the $125 added, $45 [$125×(2.0%/5.0%)] is added to the level 1 jackpot, $30 [$125×(1.2%/5.0%)] is added to the level 2 jackpot, $25 [$125×(1.0%/5.0%)] is added to the level 3 jackpot, and $20 [$125×(0.8%/5.0%)] is added to the level 4 jackpot. The meter reflects these added amounts in step 502 showing values of $70, $130, $825, and $2,020, respectively, for the four jackpot levels on link 4.

In step 504, a triggering event has caused the $55 jackpot (the level 1 jackpot on link 3) to be awarded. Thus, the $55 award is awarded to one of the players of the system as a result of the triggering event. Because the jackpot that was triggered has a reset value of $10, and was triggered at $55, the amount that must be removed is the difference between the trigger value and the reset value, which in this case is $45. Therefore, $45 is removed or "pulled" from each link as seen in step 504. On link 1, since there is only one jackpot level, the entire $45 is pulled from the level 1 meter, and the updated meter shows a value of $10,080 for the level 1 jackpot. On link 2, the $45 increment to be pulled is first pulled from the lowest level jackpot (level 1) if available, and then any remainder is pulled from consecutively higher level jackpots if necessary. This is done to ensure that none of the meters is permitted to be decremented below its reset value. In this instance, the entire $45 can be pulled off of the level 1 jackpot without decrementing the level 1 meter below its reset value. Thus, the $45 is removed from level 1, and the updated meter shows a value of $505 for the level 1 jackpot. On link 3 (the jackpot winning link), the entire $45 is pulled from the level 1 jackpot (the triggered jackpot) which causes the level 1 meter to be reset to its reset value of $10. On link 4, the $45 increment to be pulled is removed from the level 1 jackpot, and the updated meter shows a value of $25 for the level 1 jackpot.

In step 506, an additional $1,000 of coin in is received into the system. Again, the total increment is calculated by multiplying the coin in by the total increment percentage (5%). Thus, in this instance an additional $50 of increment is received, and each link in the system is updated to reflect the additional increment received from the additional coin in. As seen in step 506, on link 1 the level 1 meter receives the entire $50 and shows an updated amount of $10,030. On link 2, the $50 is divided between the two jackpot levels with the level 1 meter receiving $20, the level 2 meter receiving $30, and the updated meter showing $525 and $2,105 for the two levels, respectively. On link 3, the $50 is divided among the four jackpot levels with the level 1 meter receiving $18, the level 2 meter receiving $12, the level 3 meter receiving $10, the level 4 meter receiving $10, and the updated meter showing $28, $192, $1,035, and $5,035 for the four levels, respectively. On link 4, the $50 is divided among the four jackpot levels with the level 1 meter receiving $20, the level 2 meter receiving $12, the level 3 meter receiving $10, the level 4 meter receiving $8, and the updated meter showing $45, $142, $835, and $2,028 for the four levels, respectively.

Later, at step 508, the $2,105 jackpot (level 2 on link 2) is awarded in response to another jackpot triggering event. Thus, the $2,105 award is awarded to one of the players of the system as a result of the triggering event. Because the jackpot that was triggered has a reset value of $2,000, and was triggered at $2,105, the amount of the increment that must be pulled is the difference between the trigger value and the reset value, which in this case is $105. Therefore, $105 is removed or pulled from each link as seen in step 508. On link 1, since there is only one jackpot level, the entire $105 is pulled from the level 1 meter, and the updated meter shows a value of $10,025 for the level 1 jackpot. On link 2 (the jackpot winning link), the entire $105 is pulled from the level 2 jackpot (the triggered jackpot) which causes the level 2 meter to be reset to its reset value of $2,000. The level 1 jackpot is not disturbed because all of the increment on link 2 is pulled from the level of the triggered jackpot.

On link 3, the $105 increment to be pulled is first pulled from the lowest level jackpot (level 1) if available, and then any remainder is pulled from consecutively higher level jackpots if necessary. In this instance, the entire $105 cannot be pulled off of the level 1 jackpot without decrementing the level 1 meter below its reset value. Thus, only $18 of the $105 is removed from level 1, causing the level 1 jackpot to be decremented to its reset value of $10. This leaves $87 to still be decremented from the other jackpot levels on link 3. Next, the level 2 meter is decremented down to its reset value. In this instance, only $42 can be removed from the level 2 jackpot before it reaches its reset value or $150. Thus, $45 remains to be decremented. Next, the level 3 meter is decremented down to its reset value. In this instance, only $35 can be removed from the level 3 jackpot before it reaches it reset value of $1,000. This leaves a remainder of $10 of the $105 amount to be decremented from the level 4 meter. After the $10 is removed from the level 4 jackpot, all of the $105 increment to be pulled has been removed, and the meter shows the updated values of $10, $150, $1000, and $5,025, respectively, for the four jackpot levels on link 3. On link 4, the same process is used to pull first from the level 1 jackpot, then any remainder from levels 2, 3, and 4 successively until the entire $105 is pulled. Thus, in step 508, after the $105 is pulled from the four jackpot levels, the meter shows updated values of $20, $100, $800 and $2,025 for the four jackpot levels.

In step 510, another $1,500 of coin in is received by the system. Five percent (5%) of this amount comprises the increment amount, which in this instance is $75 to be added to the meters of all four links. As before, since link 1 only has one jackpot, the entirety of the $75 is added to the level 1 jackpot and the updated meter reflects the new jackpot value of $10,100. On link 2, the $75 is divided between the two jackpot levels with the level 1 meter receiving $30, the level 2 meter receiving $45, and the updated meter showing $555 and $2,045 for the two levels, respectively. On link 3, the $75 is divided among the four jackpot levels with the level 1 meter receiving $27, the level 2 meter receiving $18, the level 3 meter receiving $15, the level 4 meter receiving $15, and the updated meter showing $37, $168, $1,015, and $5,040 for the four levels, respectively. On link 4, the $75 is divided among the four jackpot levels with the level 1 meter receiving $30, the level 2 meter receiving $18, the level 3 meter receiving $15, the level 4 meter receiving $12, and the updated meter showing $50, $118, $815, and $2,037 for the four levels, respectively.

In step 512, the $10,100 jackpot (level 1 on link 1) is awarded in response to yet another jackpot triggering event. Thus, the $10,100 award is awarded to one of the players of the system as a result of the triggering event. Because the jackpot that was triggered has a reset value of $10,000, and was triggered at $10,100, the amount of increment that must be pulled is the difference between the trigger value and the reset value, which in this case is $100. Therefore, $100 is removed or pulled from each link as seen in step 512. On link 1 (the jackpot winning link), the entire $100 is pulled from the level 1 jackpot (the triggered jackpot) which causes the level 1 meter to be reset to its reset value of $10,000. On link 2, the $100 increment to be pulled is first pulled from the lowest level jackpot (level 1) if available, and then any remainder is pulled from consecutively higher level jackpots if necessary. In this instance, the entire $100 cannot be pulled off of the level 2 jackpot without decrementing the level 2 meter below its reset value. Thus, only $55 of the $100 is removed from level 1, causing the level 1 jackpot to be decremented down to its reset value of $500. This leaves $45 to still be decremented from the other jackpot levels on link 2. Next, the level 2 meter is decremented down to its reset value. In this instance, the entire remainder of $45 can be, and is, decremented from the level 2 jackpot meter, causing it to be decremented to its reset value of $2,000.

Continuing in step 512, on link 3, the $100 increment to be pulled is first pulled from the lowest level jackpot (level 1) if available, and then any remainder is pulled from consecutively higher level jackpots if necessary. In this instance, the entire $100 cannot be pulled off of the level 1 jackpot without decrementing the level 1 meter below its reset value. Thus, only $27 of the $100 is removed from level 1, causing the level 1 jackpot to be decremented to its reset value of $10. This leaves $73 to still be decremented from the other jackpot levels on link 3. Next, the level 2 meter is decremented down to its reset value. In this instance, only $18 can be removed from the level 2 jackpot before it reaches its reset value or $150. Thus, $55 remains to be decremented. Next, the level 3 meter is decremented down to its reset value. In this instance, only $15 can be removed from the level 3 jackpot before it reaches it reset value of $1,000. This leaves a remainder of $40 of the $100 amount to be decremented from the level 4 meter. After the $40 is removed from the level 4 jackpot, it reaches its reset value of $5,000, all of the $100 increment to be pulled has been removed, and the meter shows the updated values of $10, $150, $1000, and $5,000, respectively, for the four jackpot levels on link 3. On link 4, the same process is used to pull first from the level 1 jackpot, then any remainder from levels 2, 3, and 4 successively until the entire $100 is pulled. Thus, in step 508, after the $100 is pulled from the four jackpot levels, the meter shows updated values of $20, $100, $800 and $2,000 for the four jackpot levels. Thus, in an embodiment, when the triggered jackpot is on a link having only a single jackpot level, the result is that all of the jackpots on all of the links of the system are reset to their reset values.

In operation, the various subsystems 402, or "links" may be activated or deactivated such that some, one, all, or none of them are operational at any time. If one of the subsystems 402 is activated while others are operational, the then current total increment of the progressive pool 470 must be allocated to the reset values of the jackpots on the newly added link. This causes those jackpots on the newly added link to be "synchronized" or "brought up to speed" with the current increment generated in the system 400. For example, in the embodiment shown in FIGS. 4-5*d*, if links 1, 3, and 4 are operational and link 2 is added, link 2 should not be activated with the jackpots at the reset levels. Instead, the proper levels of the jackpots on link 2 depend on the total increment of the pool at that time. For example, if the total increment of the pool is $100, then a portion of the total increment must be added to each jackpot in similar fashion as described above herein. Thus, for the level 1 jackpot on link 2, the meter value should be the reset value plus the proper portion of the $100 increment, which in this case is $500+[$100×(2.0%/5.0%)]=$540. Similarly, the meter value of the level 2 jackpot on link 2 should be $2,000+[$100×(3.0%/5.0%)]=$2,060. Thus, in this example, if link 2 is activated at a point when links 1, 2 and 4 have been previously operational and the progressive pool holds $100 of increment, the proper values of the level 1 and level 2 jackpots on link 2 should be $540 and $2,060, respectively. Other links activated at other points in time should be set to proper meter values in similar fashion.

It should be understood that the steps in FIGS. 5*a*-5*d* are shown in discrete moments of time after certain amounts of coin in have been accumulated by the system. In operation, the coin in is not typically accumulated in lump sum fashion, but rather gradually and incrementally over time. Thus, for example, in step 502 when indicated that $2,500 of coin in has been accumulated, it should be understood that the $2,500 may be accumulated by multiple wagers on multiple gaming devices of the system, and that the increment of 5% represents a portion of each wager input, which has accumulated for a time period to be a coin in of $2,500 and an increment of $125. Additionally, the meters of the various jackpots are incremented gradually as well to reflect the stream of coin-in and increment being pulled therefrom. Thus, in an embodiment, the meters may be relatively constantly changing and increasing as increment is collected from the coin in. The steps in FIGS. 5*a*-5*d* are to be understood as time captures of certain moments of time during operation of the example embodiment described.

It should also be understood that when a certain amount of coin in is received, and a corresponding amount of increment is generated, the increment is added to each of the links on the system. Thus, at least one jackpot (and possibly more) on each link is increased in response to the generation of the increment. It is appropriate to add the generated increment to each link because when a jackpot triggering event causes a jackpot to be awarded, a corresponding increment amount is pulled or deducted from each non-winning link. In other words, the increment collected is added to all of the links, and when a jackpot is won, it is pulled from the remaining non-winning links, as described herein with relation to FIGS. 5*a*-5*d*. In this way, the correct amount of money is both added and subtracted from the progressive pool so as to be consistent with the actual coin in and increment generated.

The linked progressive system 400 of the present invention offers a number of benefits and advantages over traditional independently operated progressive systems. Because an increment amount generated by coin in is added to all of the links of the system 400, the meters displaying the jackpot amounts all increment simultaneously which adds to the players excitement and enjoyment. Moreover, the jackpots of the system 400 may be configured to be triggered more frequently as a result of the configuration of the system 400. The system 400 also allows increment from coin in received at any of the gaming devices in the system to fund a plurality or even all of the progressive wagering games. Thus, a player playing one progressive wagering game funds the progressive jackpots of multiple wagering games thereby allowing the jackpots to grow more rapidly. Moreover, when a jackpot is awarded, the increment pulled or decremented from the non-winning progressive jackpots is relatively small so as to be relatively inconsequential to the enjoyment of players.

Each of these embodiments and obvious variations thereof is contemplated as falling within the spirit and scope of the claimed invention, which is set forth in the following claims.

What is claimed is:

1. A gaming system comprising:
at least one input device;
at least one processor; and
at least one memory device storing instructions that, when executed by the at least one processor, cause the gaming system to:
receive wagers in response to inputs via the at least one input device;
increment one or more first progressive jackpots by respective individual increment amounts totaling a total increment amount, and increment one or more second progressive jackpots by respective individual increment amounts totaling the total increment amount, the total increment amount being based on the received wagers; and
in response to a triggering event awarding at least one of the first progressive jackpots, reset the awarded first progressive jackpot to its reset value and deduct the individual increment amount for the awarded first progressive jackpot from at least one of the second progressive jackpots.

2. The gaming system of claim 1, further comprising at least one display device, wherein the at least one memory device stores instructions that, when executed by the at least one processor, cause the gaming system to display on the at least one display device the one or more first progressive jackpots and the one or more second progressive jackpots.

3. The gaming system of claim 1, wherein the at least one memory device stores instructions that, when executed by the at least one processor, cause the gaming system to, in response to the triggering event, deduct the individual increment amount for the awarded first progressive jackpot from at least one of the second progressive jackpots by deducting a first portion of the individual increment amount from one of the second progressive jackpots and deducting a second portion of the individual increment amount from another one or more of the second progressive jackpots.

4. The gaming system of claim 1, wherein the at least one memory device stores instructions that, when executed by the at least one processor, cause the gaming system to, in response to the triggering event, deduct the individual increment amount for the awarded first progressive jackpot from at least one of the second progressive jackpots by deducting a first portion of the individual increment amount from one of the second progressive jackpots to reduce the one of the second progressive jackpots to its reset value and deducting a remaining second portion of the individual increment amount from another one or more of the second progressive jackpots.

5. The gaming system of claim 1, wherein the one or more first progressive jackpots are eligible to be won by a first plurality of gaming devices but not a second plurality of gaming devices, and wherein the one or more second progressive jackpots are eligible to be won by the second plurality of gaming devices but not the first plurality of gaming devices.

6. The gaming system of claim 1, wherein the total increment amount is a percentage of the received wagers.

7. The gaming system of claim 1, wherein the one or more first progressive jackpots have the same total reset expected value as the one or more second progressive jackpots.

8. The gaming system of claim 1, wherein the one or more first progressive jackpots include a single first progressive jackpot.

9. The gaming system of claim 1, wherein the at least one memory device stores instructions that, when executed by the at least one processor, cause the gaming system to:
activate one or more third progressive jackpots;
increment the one or more activated third progressive jackpots by respective individual increment amounts totaling the total increment amount; and
in response to the triggering event, deduct the individual increment amount for the awarded first progressive jackpot from at least one of the third progressive jackpots.

10. A computer-implemented method in a gaming system, comprising:
receiving wagers in response to inputs via at least one input device;
displaying on at least one display device one or more first progressive jackpots and one or more second progressive jackpots;
incrementing, by one or more processors, one or more of the first progressive jackpots by respective individual increment amounts totaling a total increment amount;
incrementing, by at least one of the one or more processors, one or more of the second progressive jackpots by respective individual increment amounts totaling the total increment amount, the total increment amount being based on the received wagers; and
in response to a triggering event awarding at least one of the first progressive jackpots, resetting, by at least one of the one or more processors, the awarded first progressive jackpot to its reset value and deducting the individual increment amount for the awarded first progressive jackpot from at least one of the second progressive jackpots.

11. The computer-implemented method of claim 10, further comprising deducting, in response to the triggering event, the individual increment amount for the awarded first progressive jackpot from at least one of the second progressive jackpots by deducting a first portion of the individual increment amount from one of the second progressive jackpots and deducting a second portion of the individual increment amount from another one or more of the second progressive jackpots.

12. The computer-implemented method of claim 10, further comprising deducting, in response to the triggering event, the individual increment amount for the awarded first progressive jackpot from at least one of the second progressive jackpots by deducting a first portion of the individual increment amount from one of the second progressive jackpots to reduce the one of the second progressive jackpots to its reset value and deducting a remaining second portion of the individual increment amount from another one or more of the second progressive jackpots.

13. The computer-implemented method of claim 10, wherein the total increment amount is a percentage of the received wagers.

14. The computer-implemented method of claim 10, wherein the one or more first progressive jackpots have the same total reset expected value as the one or more second progressive jackpots.

15. One or more machine-readable non-transitory storage media including instructions which, when executed by one or more processors, cause the one or more processors to perform operations comprising:

receiving wagers in response to inputs via at least one input device;

incrementing one or more first progressive jackpots by respective individual increment amounts totaling a total increment amount, and incrementing one or more second progressive jackpots by respective individual increment amounts totaling the total increment amount, the total increment amount being based on the received wagers; and in response to a triggering event awarding at least one of the first progressive jackpots, resetting the awarded first progressive jackpot to its reset value and deducting the individual increment amount for the awarded first progressive jackpot from at least one of the second progressive jackpots.

16. The machine-readable non-transitory storage media of claim 15, the operations further comprising deducting, in response to the triggering event, the individual increment amount for the awarded first progressive jackpot from at least one of the second progressive jackpots by deducting a first portion of the individual increment amount from one of the second progressive jackpots and deducting a second portion of the individual increment amount from another one or more of the second progressive jackpots.

17. The machine-readable non-transitory storage media of claim 15, the operations further comprising deducting, in response to the triggering event, the individual increment amount for the awarded first progressive jackpot from at least one of the second progressive jackpots by deducting a first portion of the individual increment amount from one of the second progressive jackpots to reduce the one of the second progressive jackpots to its reset value and deducting a remaining second portion of the individual increment amount from another one or more of the second progressive jackpots.

18. The machine-readable non-transitory storage media of claim 15, wherein the total increment amount is a percentage of the received wagers.

19. The machine-readable non-transitory storage media of claim 15, wherein the one or more first progressive jackpots have the same total reset expected value as the one or more second progressive jackpots.

* * * * *